(12) United States Patent
Pandey et al.

(10) Patent No.: US 8,194,534 B2
(45) Date of Patent: Jun. 5, 2012

(54) BLADE SERVER SYSTEM WITH AT LEAST ONE RACK-SWITCH HAVING MULTIPLE SWITCHES INTERCONNECTED AND CONFIGURED FOR MANAGEMENT AND OPERATION AS A SINGLE VIRTUAL SWITCH

(75) Inventors: Vijoy Pandey, San Jose, CA (US);
Tienwei Chao, San Jose, CA (US);
Dar-Ren Leu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/816,225

(22) PCT Filed: Feb. 28, 2006

(86) PCT No.: PCT/US2006/007012
§ 371 (c)(1),
(2), (4) Date: Apr. 5, 2008

(87) PCT Pub. No.: WO2006/093929
PCT Pub. Date: Sep. 8, 2006

(65) Prior Publication Data
US 2008/0275975 A1      Nov. 6, 2008

Related U.S. Application Data

(60) Provisional application No. 60/657,220, filed on Feb. 28, 2005.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........ 370/216; 370/217; 370/220; 370/242; 370/244; 370/380; 370/419

(58) Field of Classification Search .................. None
See application file for complete search history.

(56) References Cited

U.S. PATENT DOCUMENTS
6,331,983 B1 * 12/2001 Haggerty et al. ............. 370/400
(Continued)

FOREIGN PATENT DOCUMENTS
WO        02/08891 A2      1/2002

OTHER PUBLICATIONS
Supplementary European Search Report dated Sep. 9, 2010.

*Primary Examiner* — Ayaz Sheikh
*Assistant Examiner* — Peter Chau
(74) *Attorney, Agent, or Firm* — Guerin & Rodriguez, LLP; Michael A. Rodriguez

(57) ABSTRACT

Described is a rack-switch including a rack and a plurality of blade server chassis within the rack. Each blade server chassis has a plurality of server blades in communication with at least one switch. Each switch includes a plurality of external ports. At least two of the external ports of each switch are inter-switch link (ISL) ports. The rack-switch also includes a plurality of inter-switch links. Each inter-switch link electrically connects one ISL port of one of the switches to one ISL port of another of the switches. The plurality of inter-switch links interconnects the switches such that the switches are daisy chained in a loop. The inter-switch links convey Ethernet packets representing server-to-server communications between server blades of different blade server chassis.

19 Claims, 10 Drawing Sheets

U.S. PATENT DOCUMENTS

| | | |
|---|---|---|
| 6,431,765 B1 | 8/2002 | Chen |
| 6,636,499 B1 * | 10/2003 | Dowling ................. 370/338 |
| 6,766,482 B1 * | 7/2004 | Yip et al. ................. 714/717 |
| 6,795,403 B1 * | 9/2004 | Gundavelli ............... 370/256 |
| 6,810,021 B1 * | 10/2004 | Sakurai .................... 370/255 |
| 6,976,088 B1 * | 12/2005 | Gai et al. ................. 709/238 |
| 7,003,705 B1 * | 2/2006 | Yip et al. ................. 714/717 |
| 7,138,733 B2 * | 11/2006 | Sanders et al. ........... 307/147 |
| 7,440,393 B2 * | 10/2008 | Nilakantan et al. ...... 370/216 |
| 7,672,228 B1 * | 3/2010 | Senevirathne et al. .... 370/219 |
| 2002/0188718 A1 * | 12/2002 | McGraw et al. .......... 709/224 |
| 2003/0112582 A1 | 6/2003 | Sanders |
| 2003/0165119 A1 * | 9/2003 | Hsu et al. ................. 370/258 |
| 2003/0208618 A1 * | 11/2003 | Mor et al. ................. 709/238 |
| 2004/0047336 A1 * | 3/2004 | Shabtay et al. ........... 370/351 |
| 2004/0103327 A1 | 5/2004 | Dake et al. |
| 2004/0109406 A1 * | 6/2004 | Rothman et al. ......... 370/216 |
| 2004/0199567 A1 | 10/2004 | Lund |
| 2005/0058063 A1 * | 3/2005 | Masuyama et al. ...... 370/217 |
| 2005/0063354 A1 * | 3/2005 | Garnett et al. ........... 370/351 |
| 2005/0068888 A1 * | 3/2005 | Komarla et al. .......... 370/216 |
| 2005/0198232 A1 * | 9/2005 | Haalen et al. ............ 709/221 |
| 2005/0198523 A1 * | 9/2005 | Shanbhag et al. ........ 713/200 |
| 2006/0087962 A1 * | 4/2006 | Golia et al. ............... 370/216 |
| 2006/0165099 A1 * | 7/2006 | Doherty et al. ........... 370/397 |

* cited by examiner

BLADE SERVER SYSTEM WITH AT LEAST ONE RACK-SWITCH HAVING MULTIPLE SWITCHES INTERCONNECTED AND CONFIGURED FOR MANAGEMENT AND OPERATION AS A SINGLE VIRTUAL SWITCH

RELATED APPLICATION

This application claims the benefit of the filing date of U.S. Provisional Application Ser. No. 60/657,220, filed Feb. 28, 2005, titled "RackSwitch Stacking for Blade Server Chasses," the entirety of which provisional application is incorporated by reference herein.

FIELD OF THE INVENTION

The invention relates generally to communication networks. More specifically, the invention relates to virtual switching in blade server systems.

BACKGROUND

Blade server chassis are becoming increasingly popular. In general, a blade server chassis houses a plurality of thin, modular electronic circuit boards, referred to as server blades. Each server blade includes one or more processors, memory, network controllers, and input/output (I/O) ports, and functions as a server, typically dedicated to a particular application. The blade server chassis are usually stacked within racks, with each rack holding multiple blade server chassis. In addition, each blade server chassis has a switch for providing communication between the server blades and external communication networks. Often, the switches within a rack are configured and managed individually, which can consume much of an administrator's time and resources.

SUMMARY

In one aspect, the invention features a rack-switch including a plurality of switches. Each switch has a plurality of external ports. At least two of the external ports of each switch are inter-switch link (ISL) ports. The rack-switch also includes a plurality of server blades and a plurality of inter-switch links. Each server blade is in electrical communication with one of the plurality of switches. Each inter-switch link electrically connects one ISL port of one of the switches to one ISL port of another of the switches. The inter-switch links interconnect the switches such that the switches are daisy chained.

In another aspect, the invention features a rack-switch including a rack, a plurality of blade server chassis within the rack, and a plurality of inter-switch links. Each blade server chassis has a plurality of server blades in communication with at least one switch. Each switch has a plurality of external ports. At least two of the external ports of each switch are inter-switch link (ISL) ports. Each inter-switch link electrically connects one ISL port of one of the switches to one ISL port of another of the switches. The plurality of inter-switch links interconnects the switches such that the switches are daisy chained in a loop. The inter-switch links convey Ethernet packets representing server-to-server communications between server blades of different blade server chassis.

In still another aspect, the invention features a blade server system having a plurality of rack-switches. Each rack-switch includes a plurality of switches, a plurality of server blades, and a plurality of inter-switch links. Each switch has a plurality of external ports, at least two of the external ports of each switch being inter-switch link (ISL) ports. Each server blade is in electrical communication with one of the plurality of switches. Each inter-switch link electrically connects one ISL port of one of the switches to one ISL port of another of the switches. The plurality of inter-switch links interconnects the switches such that the switches are daisy chained.

In yet another aspect, the invention features a method for managing and operating a rack-switch having plurality of switches electrically connected to a plurality of server blades. The method includes electrically interconnecting the plurality of switches in a daisy-chain loop using inter-switch links. Each inter-switch link electrically connects one inter-switch link (ISL) port of one of the plurality of switches to one ISL port of another of the plurality of switches. The inter-switch links carry Ethernet packets representing server-to-server data communications between server blades. The method also includes detecting the daisy-chain loop formed by the inter-switch links and blocking one of the ISL ports from transmitting data communications over one of the inter-switch links.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In brief overview, blade server systems embodying the invention include one or more rack-switches. Each rack-switch includes a plurality of server blades in communication with a plurality of interconnected blade server switches. Each blade server switch has one uplink port for communicating with an external upstream router and a plurality of inter-switch links (ISLs) for communicating with the other blade server switches in the rack-switch. The ISLs interconnect the switches into a daisy-chained loop. When operating in rack-switch mode, the switches of a rack-switch operate as a single virtual switch, with the server blades functioning like a single server pool.

The plurality of interconnected switches of a rack-switch can reside in a single or in multiple blade server chassis. One embodiment, referred to herein as a dual-stack configuration, includes redundant rack-switches: an active rack-switch and a standby rack-switch. In general, the term "stack" describes a physical stacked arrangement of blade server switches in the same multi-chassis rack-switch. Each stack of the dual-stack configuration corresponds to one of the redundant rack-switches. Notwithstanding the general meaning of the term stack, a rack-switch comprised of stacked blade server switches can span multiple physically separate racks.

Operation of a rack-switch can entail the use of various protocols, including an auto-discovery (AD) protocol, a ring-detection and control (RDC) protocol, an uplink-forwarding control (UFC) protocol, and a rack-switch failover message (RFM) protocol. The AD protocol operates to discover which switches are in a rack-switch; the RDC protocol detects the loop (or ring) formed by the daisy-chained blade server switches; the UFC protocol determines the Spanning Tree Protocol (STP) state of each uplink port in the rack-switch; and the RFM protocol operates to propagate to each switch in a rack-switch information used to trigger and implement a failover from an active rack-switch to a standby rack-switch.

The blade server system can include a single point of management (SPM) for use by an administrator to manage the stack (or cluster) of blade server switches within the rack-switch. From the SPM, the administrator runs an application program (e.g., Java-based or CLI-based) for configuring and managing the stack of switches in the rack-switch. Utilities for management tools, such as the Simple Network Management Protocol (SNMP), command line interface (CLI), and browser-based interface (BBI), can propagate configuration information from one switch to the other switches in the same switch group within the rack-switch. The ability to manage the configuration from a central location, as provided by the SPM, can serve to decrease the burden on the network management resources of the administrator.

Figure 1:
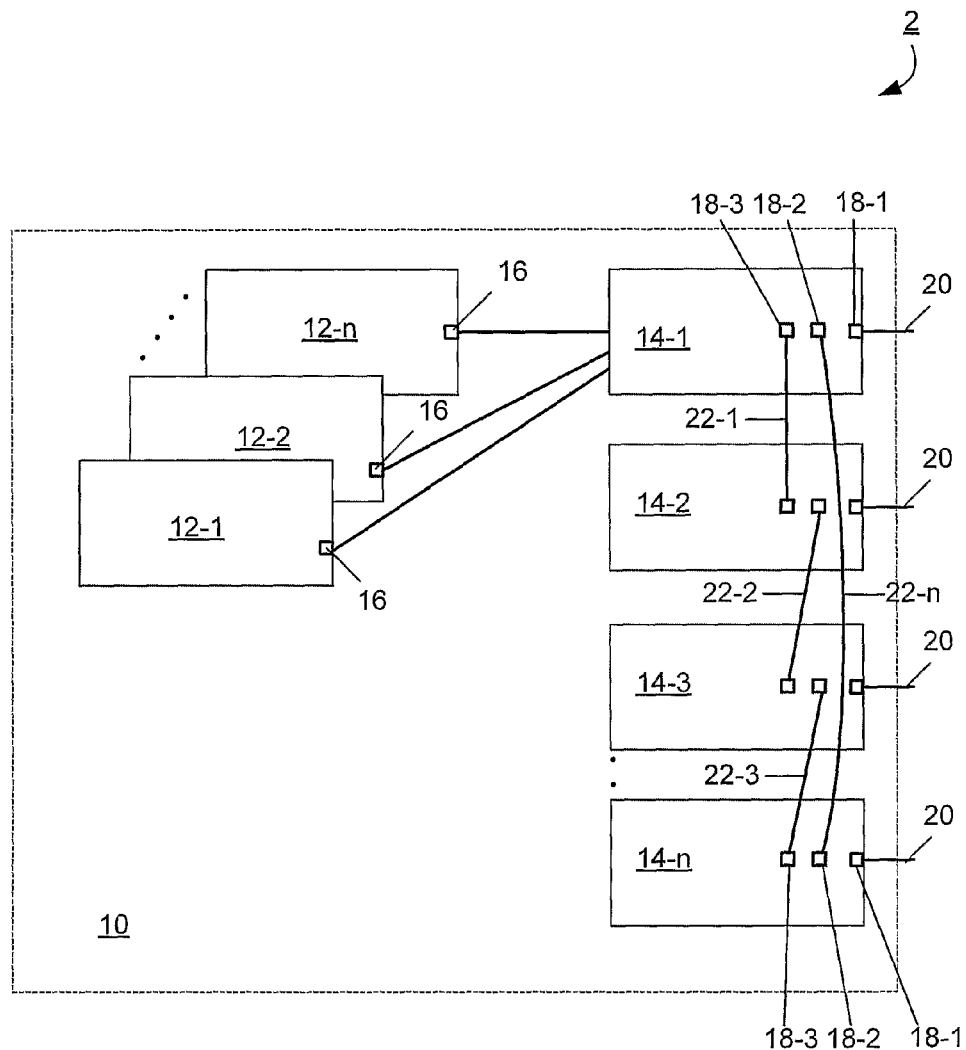
FIG. 1 is a block diagram generally representing system architecture for a rack-switch in which aspects of the invention may be implemented.

FIG. 1 shows an embodiment of system architecture 2 for a rack-switch 10 in which aspects of the invention may be implemented. The rack-switch 10 includes a plurality of server blades 12-1, 12-2, 12-n (generally, 12) and a plurality of blade server switches 14-1, 14-2, 14-3, and 14-n (generally, switch 14). The number of server blades 12 in the rack-switch 10 can vary (e.g., 10, 14), depending upon the particular rack-switch implementation. In addition, the principles of the invention extend to embodiments of rack-switches with fewer or more than four switches (i.e., at least two). The various components of the rack-switch 10 can be installed within one or more racks (i.e., a cabinet structure for holding electronic equipment).

Each server blade 12 includes at least one internal port 16 by which that server blade 12 communicates with one of the switches 14. For illustration purposes, in FIG. 1 each server blade 12 in the plurality of server blades 12 communicates with the switch 14-1. Other embodiments can have the server blades 12 communicating with different switches 14.

Each switch 14 includes a plurality of external ports 18-1, 18-2, 18-3 (generally, 18). External ports are distinguished from internal ports in that external ports are generally used for communications outside of the chassis (FIG. 2) housing the switch 14, whereas internal ports are used for communications between the switch 14 and the server blades 12 inside the chassis. In one embodiment, each external port 18 communicates according to the 10 Gigabit Ethernet standard, transmitting (or receiving) information at a 10 Gbps data rate.

A first one of the ports 18-1 serves as an uplink 20 for connecting the switch 14 and the server blades 12 communicating with that switch 14 to an external entity (e.g., a network, an upstream router). XFP (10 Gigabit Small Form Factor Pluggable) or SFP technology can be used to implement the uplink. Communications with the external entity through the uplink 20 may be referred to as server-to-Internet communications, packets, or traffic.

The other external ports 18-2, 18-3 of the switch 14 are used to connect the switch 14 to the other switches 14 in the rack-switch 10 in a daisy chain loop. In one embodiment, these external ports 18-2, 18-3 use CX4 connectors. Each link in the daisy chain is referred to herein as an inter-switch link (ISL). In the exemplary embodiment shown, one ISL 22-1 connects the switch 14-1 to the switch 14-2, a second ISL 22-2 connects the switch 14-2 to the switch 14-3, and a third ISL 22-3 connects the switch 14-3 to the switch 14-n. An nth ISL 22-n between the switch 14-n and the switch 14-1 completes a loop. Daisy chaining is a cost-effective technique for grouping the blade server switches 14 and provides redundancy as described herein. The switches 14 exchange communications with each other over the ISLs 22. Herein, communications passing over an ISL 22 may be referred to as server-to-server communications, packets, or traffic. Communications over any one of the ISLs can be bidirectional.

Figure 2:
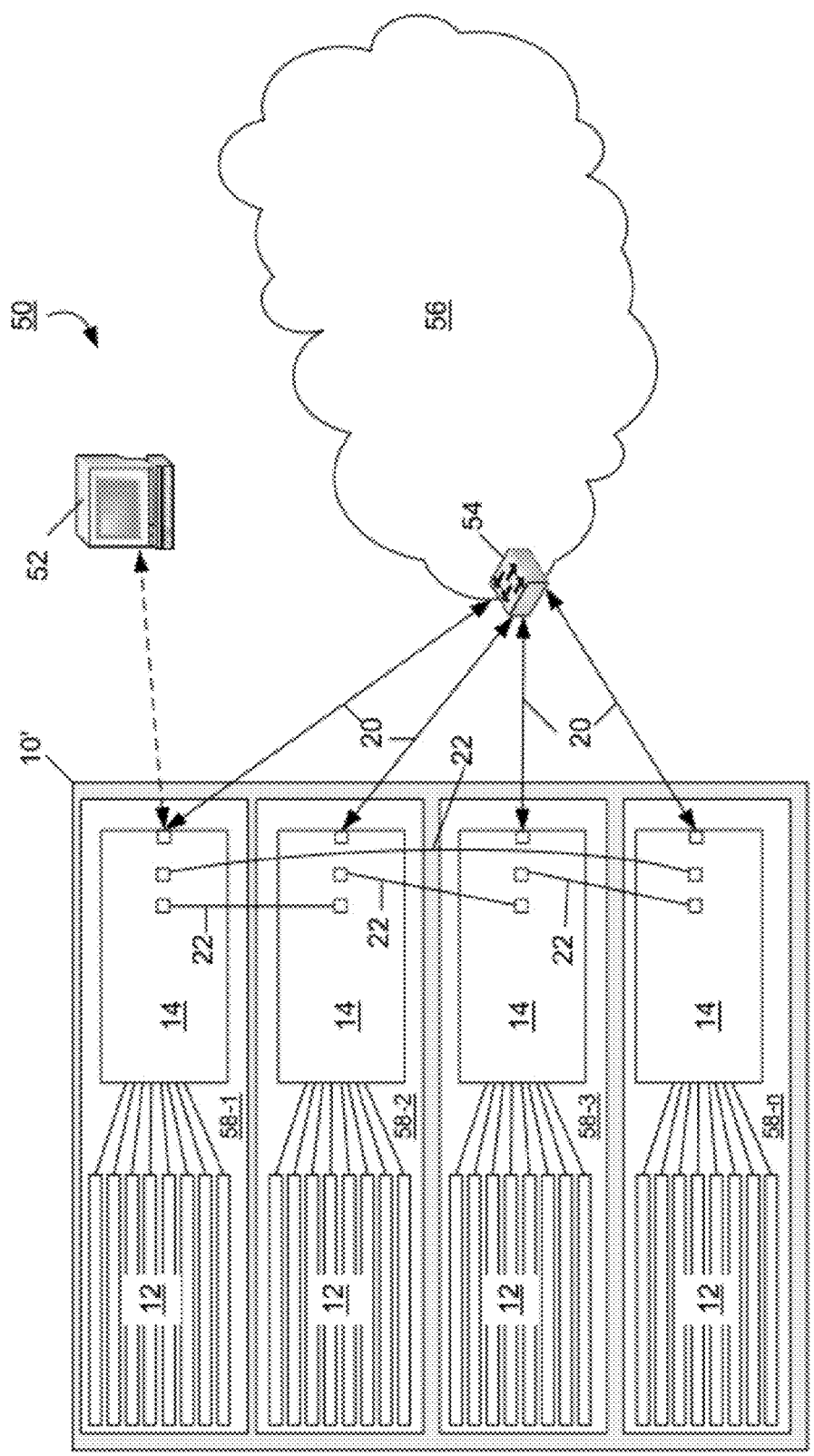
FIG. 2 is an exemplary networking environment in which aspects of the invention may be implemented.

FIG. 2 shows an exemplary networking environment 50 in which aspects of the invention may be implemented. The networking environment 50 can have arbitrary size and complexity. In this example, the networking environment 50 includes an embodiment of a rack-switch 10' in communication with a management system 52 and with a network element 54 (e.g., an upstream router) connected to a communications network 56, e.g., the Internet.

The rack-switch 10' includes a plurality of stacked blade server chassis 58-1, 58-2, 58-3, and 58-n (generally, 58). Each blade server chassis 58 includes a plurality of server blades 12 in communication with one or more switches 14. The ISLs 22 interconnect the switches 14 in a daisy-chain loop. In this example, each switch 14 is also in communication with the network element 54 on the network 56 through an uplink 20. In addition, the management system 52 is in communication with one of the switches (here, e.g., in chassis 58-1). The management system 52 may be on the network 56 and communicates with the rack-switch 10' through one of the uplinks 20.

Single Point of Management (SPM)

The management system 52 serves as a single point of management (SPM). By executing an application program at the management system 52, an administrator can communicate with, configure, and manage the plurality of switches 14 using one or more management tools, e.g., SNMP, CLI, and BBI. In one embodiment, the application program is JAVA-based to ensure portability of the SPM to managements systems employing different operating systems, such as Windows XP™, Linux™, and Unix™. Although shown to be at the management system 52, it is to be understood that, in an alternative embodiment, the SPM can reside in one of the switches 14.

The application program enables an administrator to configure each switch 14 either as an individual switch or as a stack-switch (in order for the switch to be a functional part of the rack-switch 10'). When the switches 14 are configured to be stack-switches, the administrator can manage the switches 14 as a single switch (i.e., the rack-switch 10'). The application program graphically displays the rack-switch 10' to the administrator as a single virtual switch instead of as multiple individual switches.

Figure 3:
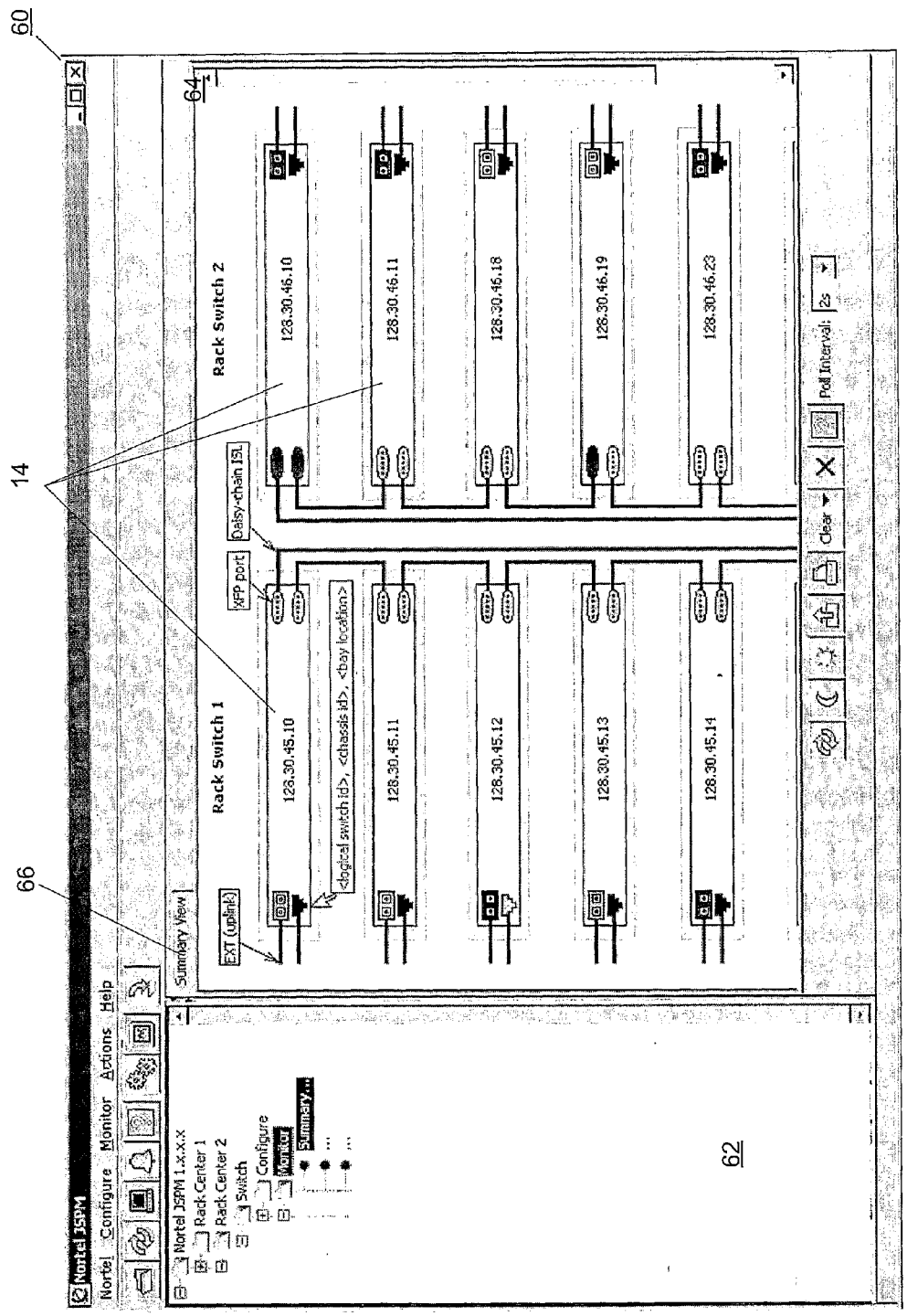
FIG. 3 is an example of a screen shot produced by single point of management software used to configure and monitor a plurality of switches, here configured as dual rack-switches, as a single virtual switch.

FIG. 3 shows an example of a screen shot 60 produced by the SPM application program for representing the rack-switch 10' as a single virtual switch. In the left-hand pane 62 of the screen shot 60 appears a list of rack-switches, individual switches, or both, that are available for configuring and monitoring. Highlighting denotes the rack-switch (or individual switch) being configured (i.e., "configure" folder) or monitored (i.e., "monitor" folder). In the exemplary screen shot 60, the "Switch" folder is open and the monitor folder highlighted, indicating that the "Switch" is being monitored. Highlighting the Summary bullet item provides a summary view of the "Switch."

As an example of an implementation of the "Switch," the summary view shows dual rack-switches (i.e., Rack Switch 1 and Rack Switch 2) in the right-hand pane 64. Each rack-switch includes a plurality of daisy-chained switches 14, identified by their IP addresses. A tab 66 in the foreground indicates that the SPM is presenting a "Summary View" of the "Switch" for monitoring.

The "configure" folder presents the administrator with configuration-related pages including a VLAN configuration page and an IP interface configuration page (not shown). Each of such pages provides a global view of the rack-switch 10'. For example, in the configuration of a Virtual Local Area Network (VLAN), a view of every port in the rack-switch 10' appears. Each port is selectable, so that the administrator can readily add ports or remove that port from the VLAN. When an administrator presses one of the "Apply, Save," or "Set" buttons (appearing in the right-hand pane 64), the configuration settings on the displayed page are applied to the individual switch or to the group of switches in a rack-switch highlighted in the left-hand pane 62. Accordingly, with a single operation, the administrator can apply a page of configuration changes to each switch in the rack-switch 10'. Any changes made to a switch 14 by a management tool (e.g., SNMP, CLI, BBI) can operate to overwrite values previously set through the SPM. A single configuration file can serve to store the configuration information of the switches 14 in the rack-switch 10'.

Through the SPM, the administrator can add a switch to the rack-switch 10' (i.e., by configuring the switch as a stack-switch), configure each switch in the rack-switch with an IP address, configure VLAN/STG (Spanning Tree Group) mapping and VLAN/port mapping, and assign to each uplink port 18 a precedence in an STG. To simplify the setup of the rack-switch 10', the SPM can initiate auto-discovery. The administrator can also choose one of the switches 14 in the rack-switch 10' as a master switch. Through the master switch, the SPM application program can display (e.g., at the management system 52) the current parameter values in the rack-switch 10'.

Figure 4:
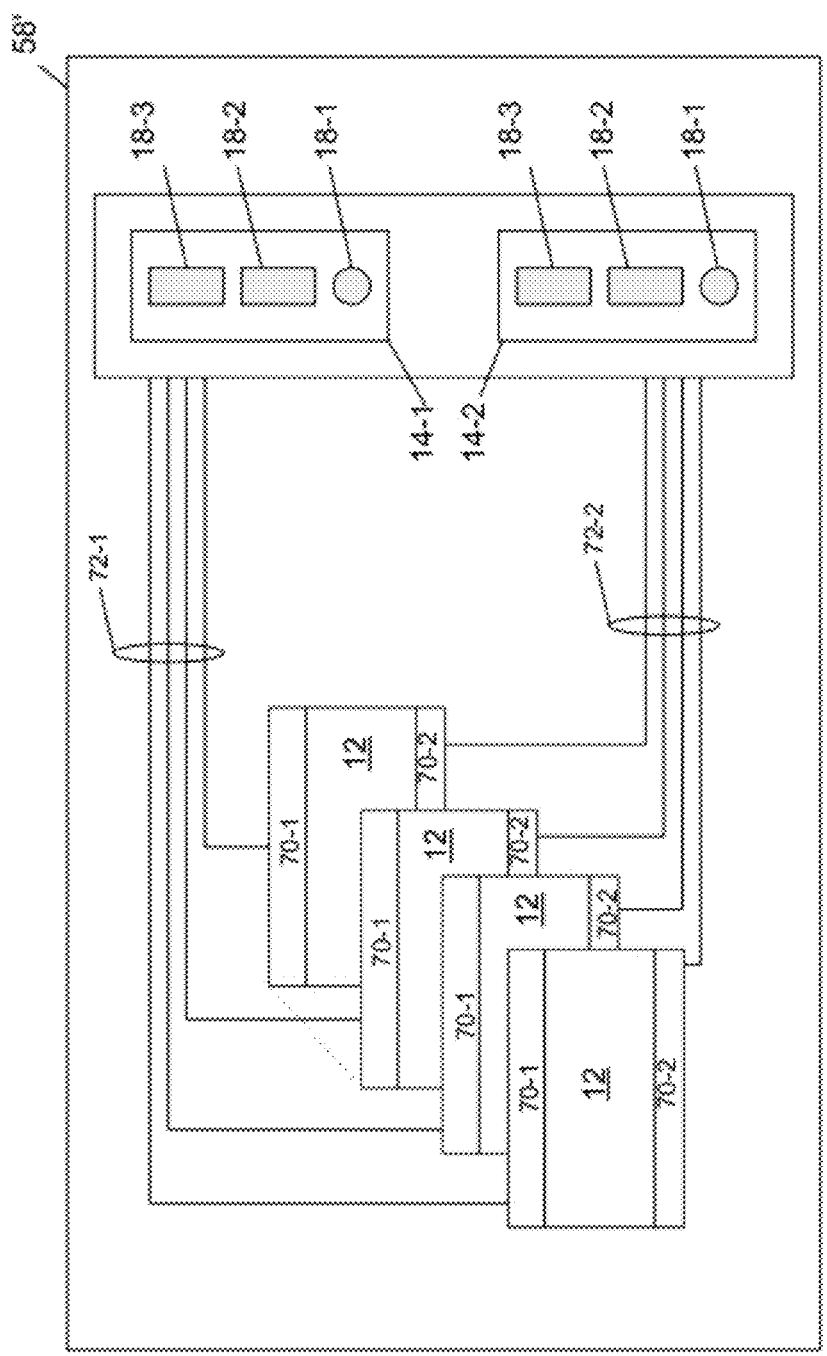
FIG. 4 is a diagram of an exemplary embodiment of a blade server chassis in which aspects of the invention may be implemented.

The rack-switch 10' shown in FIG. 2 has only one switch 14 per blade server chassis 58. FIG. 4 shows another embodiment of a blade server chassis 58' having a plurality of switches 14-1, 14-2 (generally, 14). The switches 14 are located within separate bays within the chassis 58'. Each server blade 12 in the chassis 58' includes a plurality of network interface cards (NIC) 70-1, 70-2 (generally, NIC 70); there is one NIC 70 for each switch 14. For example, a server blade 12 would have three NICs in a chassis having three switches 14. Through the NICs 70, each server blade 12 is in communication with each switch 14 in the chassis 58'. In this example, the server blades 12 communicate with switch 14-1 through the NICs 70-1 over internal links 72-1 and with switch 14-2 through the other NICs 70-2 over internal links 72-2. This connectivity provides redundancy in the event of trunk failure. For each server blade 12, one of the internal links 72-1, 72-2 is an active link and the other is a standby link. During operation of the chassis 58', the active link of the each server blade 12 is the same link for each of the server blades 12.

Single-Chassis (L2) Failover

In a single-chassis environment, such as shown in FIG. 4, in which each server blade has multiple NICs, failover (teaming) provides fault tolerance by enabling the ability to monitor a single trunk or multiple trunks for failure. If a failure event is detected, the internal links to a predefined set of server ports are disabled to trigger teaming software on each server blade to change its active link from one NIC to the other NIC. As a result, each server blade transitions from communicating with one switch to communicating with an alternative switch. For example, if each server blade 12 is communicating with switch 14-1 over active links 72-1, after a failover, each server blade 12 is communicating with switch 14-2 over standby links 72-2.

Figure 5:
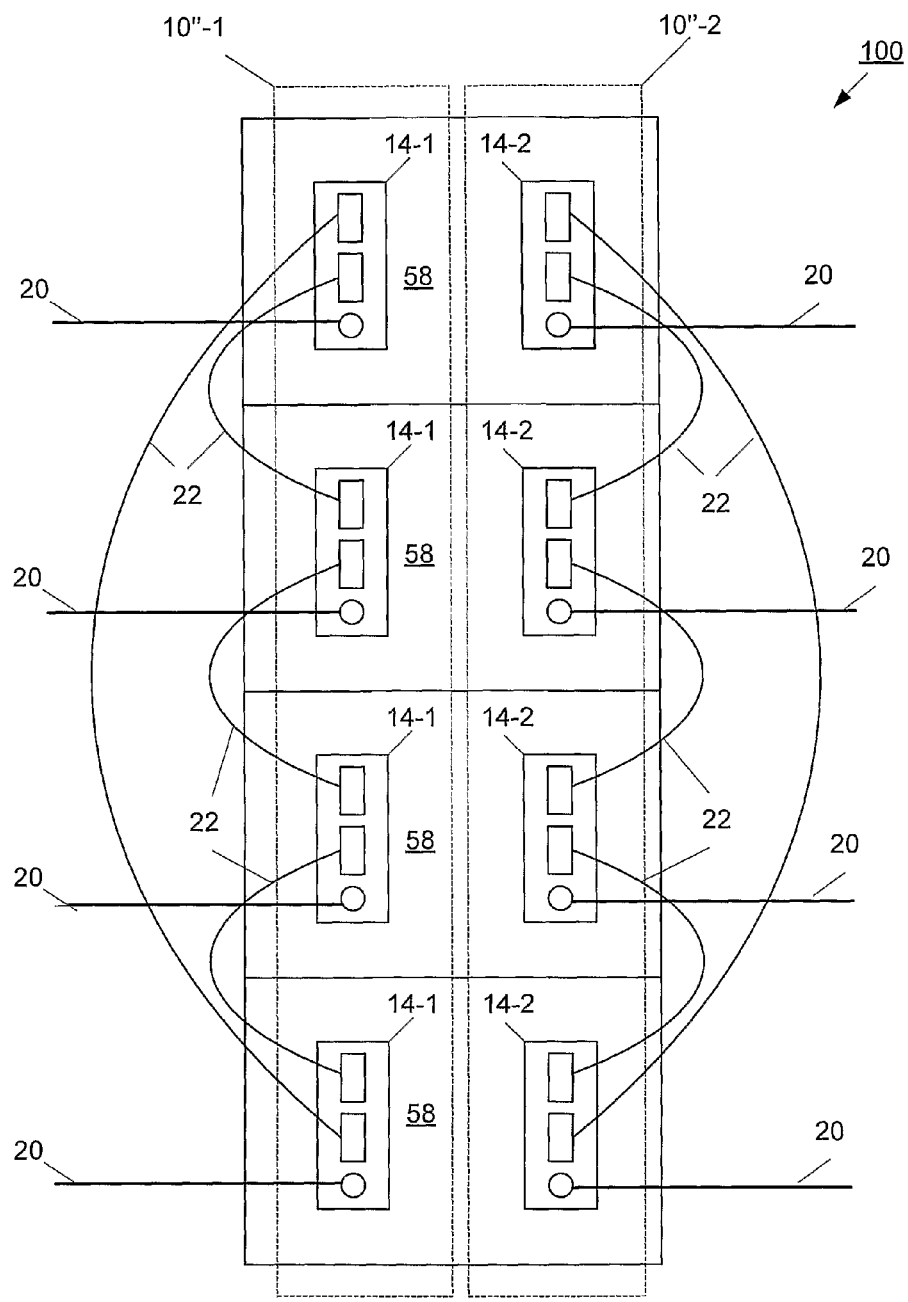
FIG. 5 is a diagram of another exemplary embodiment of a rack-switch comprising dual-stacks or dual rack-switches.

FIG. 5 shows an end view of an embodiment of a dual-stack configuration for a blade server system 100, including a plurality of stacked blade server chassis 58. Each blade server chassis 58 includes a pair of switches 14-1, 14-2 in communication with a plurality of server blades (not shown), as described above in connection with FIG. 4. In each chassis 58, switch 14-1 is in a first bay location and switch 14-2 is in a second bay location. In the embodiment shown, switches located in the same bay location are connected into the same daisy-chain loop; that is, switches 14-1 are in a first daisy-chain loop, and switches 14-2 are in a second daisy-chain loop. Each interconnected stack of switches corresponds to a different rack-switch. Stacked switches 14-1 correspond to rack-switch 10"-1 and stacked switches 14-2 correspond to rack-switch 10"-2.

For normal operation, one daisy-chained stack of switches (i.e., rack-switched) is sufficient. The second stack of switches can provide redundancy. If one or more switches need replacing in the active rack-switch, operation can transition to the standby rack-switch. Rack-switch failover, described below, can be enabled to execute the transition from one rack-switch to the other rack-switch.

For increasing bandwidth for server-to-server communications, both rack-switches 10"-1, 10"-2 can be concurrently active (i.e., no redundant standby rack-switch). For example, VLAN 10 traffic can pass mainly on rack-switch 10"-1 and VLAN 20 traffic can pass on rack-switch 10"-2.

Normal operation of a rack-switch can involve the execution of various protocols, including an auto-discovery (AD) protocol, a ring-detection control (RDC) protocol, an uplink forwarding control (UFC) protocol, and a rack-switch failover message (RFM) protocol, described in more detail below.

Auto-Discovery Protocol

To simplify the setup of a rack-switch, an administrator of the SPM can initiate execution of the auto-discovery protocol to discover which switches are in the rack-switch. In a request for auto-discovery, the SPM application program specifies the port that the switch is to use to perform the auto-discovery and the interface for which an IP address is to be returned. In one embodiment, the AD protocol specifies an ISL port and AD protocol packets pass over the daisy-chain loop formed by the ISLs.

In other embodiments, auto-discovery can occur either at a management port or at the external XFP (or SFP) port. When the SPM requests auto-discovery at a management port, the SPM application program requests and each switch replies with the IP address of the management interface of that switch. When the SPM requests auto-discovery at an external XFP (SFP) port, the SPM application program requests the IP address of each switch in the same subnet (and, thus, in the same VLAN).

Each message in the AD protocol is an L2 multicast packet (a specific L2 (802.3) multicast MAC address can be reserved for the protocol). Each auto-discovery packet is sent through the native VLAN with a VLAN tag. The AD protocol includes two types of messages: (1) an auto-discovery request; and (2) an auto-discovery reply.

Figure 6:
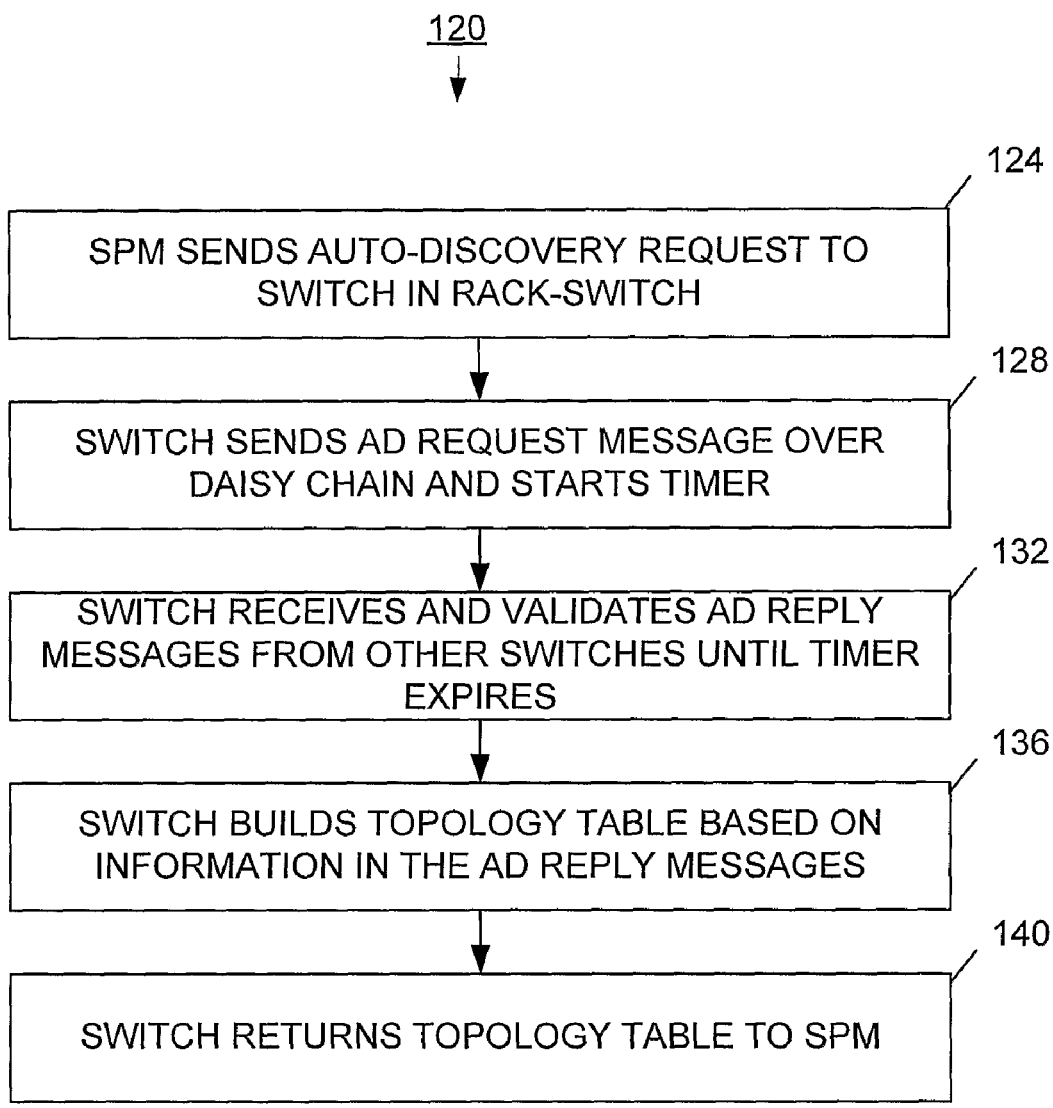
FIG. 6 is a flow diagram of an embodiment of an auto-discovery process for discovering switches within a rack-switch.

FIG. 6 shows an embodiment of a process 120 for discovering which switches are in a rack-switch in accordance with the AD protocol. In the description of the process 120, references are also made to FIG. 2. At step 124, the SPM sends an auto-discovery request command to one of the switches in the rack-switch 10' (here, e.g., to the switch 14 of the chassis 58-1). In response to the request from the SPM, the switch 14 with which the SPM is communicating issues (step 128) an auto-discovery request message over an ISL. This switch 14 is seeking a reply from each switch in the same daisy chain— or in the same subnet, in those embodiments in which a management or SFP port is used—as the requesting switch. An auto-discovery request message can be repeated (e.g., once per second for three seconds) to account for the possibility that a switch in the daisy chain may miss a previous message. Upon issuing the initial auto-discovery request message, the requesting switch 14 also starts a timer (a configurable value) and waits for the switches in the same daisy chain to reply.

In reply to receiving an auto-discovery request message, each switch sends an auto-discovery reply message that includes the IP address of the requested interface, the chassis ID (i.e., chassis UUID), and the bay location of the switch in the chassis. For each auto-discovery process, auto-discovery request and auto-discovery reply messages use the same sequence number for matching purposes.

Upon receiving each auto-discovery reply message, the requesting switch 14 validates (step 132) the sequence number in the reply packets, collects, and organizes (step 136) the information in a topology table. The requesting switch 14 collects auto-discovery reply messages until the timer expires. Reply messages arriving after the timer expires are ignored and do not contribute to the topology table. The requesting switch 14 also adds itself to the topology table. After the timer expires, the switch 14 returns (step 140) the topology table to the SPM (upon request from the SPM).

To help track the progress of the auto-discovery process, the requesting switch 14 maintains an auto-discovery topology table (ADTT) state machine. The state machine has four states: (1) IDLE; (2) START; (3) IN-PROGRESS; and (4) COMPLETE. The IDLE state indicates that there are no outstanding auto-discovery requests from the SPM still in progress. Upon receiving an auto-discovery request from the SPM, the switch 14 changes the state machine to the START state. After the switch 14 issues an auto-discovery request message, the state machine transitions to the IN-PROGRESS state. While the state machine indicates that an auto-discovery request is currently IN-PROGRESS, the SPM is unable to execute SNMP requests to obtain the topology table on the switch.

After the timer expires, the requesting switch 14 sets a MIB variable to transition the ADTT state machine to COM-PLETE. After initiating the AD protocol, the SPM periodically polls this MIB variable at the switch 14, and retrieves the topology table using an SNMP query upon determining that the state machine has transitioned to the COMPLETE state.

After the SPM retrieves the topology table, the SPM can restore the ADTT state machine to the IDLE state, thus freeing resources. If the SPM fails to reset the ADTT state machine to the IDLE state, a timer can be used to dictate this outcome when the timer expires. If the SPM wants to abort the auto-discovery process, the SPM can set the ADTT state machine to the COMPLETE state to cease collection of the information for the topology table and to free the resources. If an error occurs during the auto-discovery process, the state machine returns to the IDLE state until another start event occurs to restart the topology table collection.

Ring-Detection Control Protocol

The Ring Detection Control (RDC) protocol detects the ring (i.e., loop) formed by the daisy-chained switches connected by the ISLs. In brief overview, the RDC protocol elects a master node. The other nodes are called transit nodes. The master node actively monitors the operational status of the ring. Under the normal operation, the master node blocks one of the ISL ports to avoid a data loop in the ring. If the master node detects a ring fault, the master node unblocks the blocked ISL port to allow data to pass through that port. To participate in the RDC protocol, a switch needs to be configured for operating in the rack-switch.

The RDC protocol includes four functions: (1) detecting if a ring forms; (2) detecting if the ring becomes broken in the ISL; (3) assigning IP addresses from the SPM to each switch in the rack-switch; and (4) changing ISL STP states. To accomplish the functions there are at least four types of RDC protocol PDUs: (1) Ring-check messages; (2) Ring-break messages; (3) Push IP addresses messages; and (4) Make-FWD messages. Each RDC protocol PDU is an untagged 802.3 multicast packet sent through a native VLAN without a VLAN tag. RDC protocol is a hop-by-hop protocol; that is, RDC protocol PDUs sent by a switch are received and processed by the next-hop neighbors of the sender. A switch can send PDUs across an ISL link although the STP state of that ISL link is BLOCKED.

Master Node Election

Figure 7:
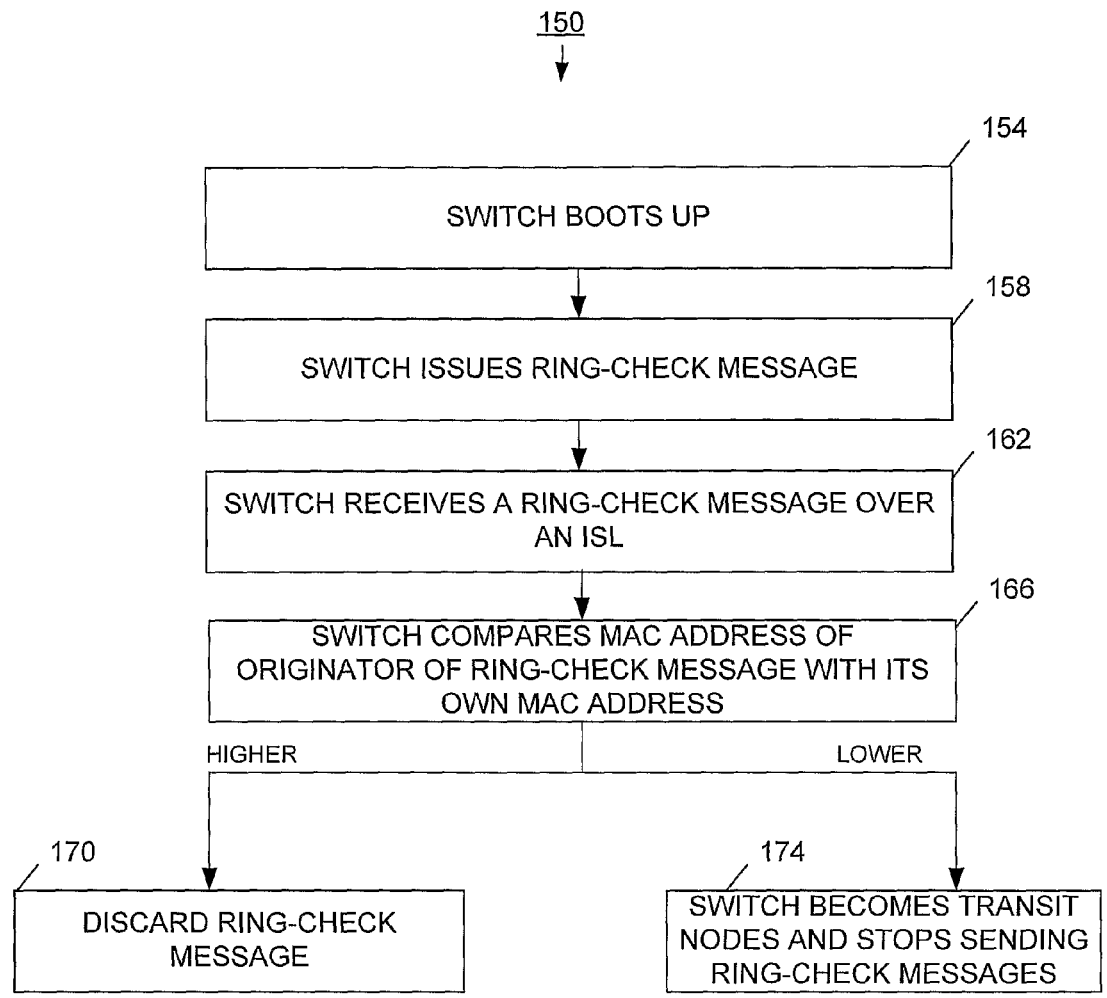
FIG. 7 is a flow diagram of an embodiment of process of electing a master node in the rack-switch

FIG. 7 shows an embodiment of a process 150 by which the rack-switch 10' prepares for virtual single-switch operation by electing a master node. When, at step 154 a switch boots up (initializes and becomes operational), the switch assumes itself to be the master node and issues (step 158) a Ring-check message at a rate based on the time interval configured in each of its ISL ports. The switch sends the Ring-check message over each of its ISL ports. The switch originating the Ring-check message includes its own MAC address in the message as the first node of the list. The Ring-check message also contains a time interval (hello interval) to inform the other switches of the frequency at which the originator will send Ring-check messages.

When the switch receives (step 162) a Ring-check message originating from another switch, the receiving switch compares (step 166) the MAC address of the other switch with its own MAC address. If the originator of the Ring-check message has a higher MAC address than its own MAC address, the receiving switch discards (step 170) the Ring-check message. If the MAC address of the originator is lower than its own MAC address, the receiving switch becomes (step 174) a transit node and stops originating Ring-check messages. In this manner, each switch self-determines from received Ring-check messages whether to be a transit node or the master node. Consequently, in this embodiment, the switch in the rack-switch with the lowest MAC address becomes the master node.

If a transit node does not receive a communication from the master node within twice (i.e., 2×) the hello interval advertised by the master node, the master node election process restarts (i.e., the transit node issues a Ring-check message) although the ring is terminated. The newly elected master node reports the ring termination. When the previous master node recovers, the newly elected master node returns to the role of a transit node.

Ring-Formation Detection

Figure 8:
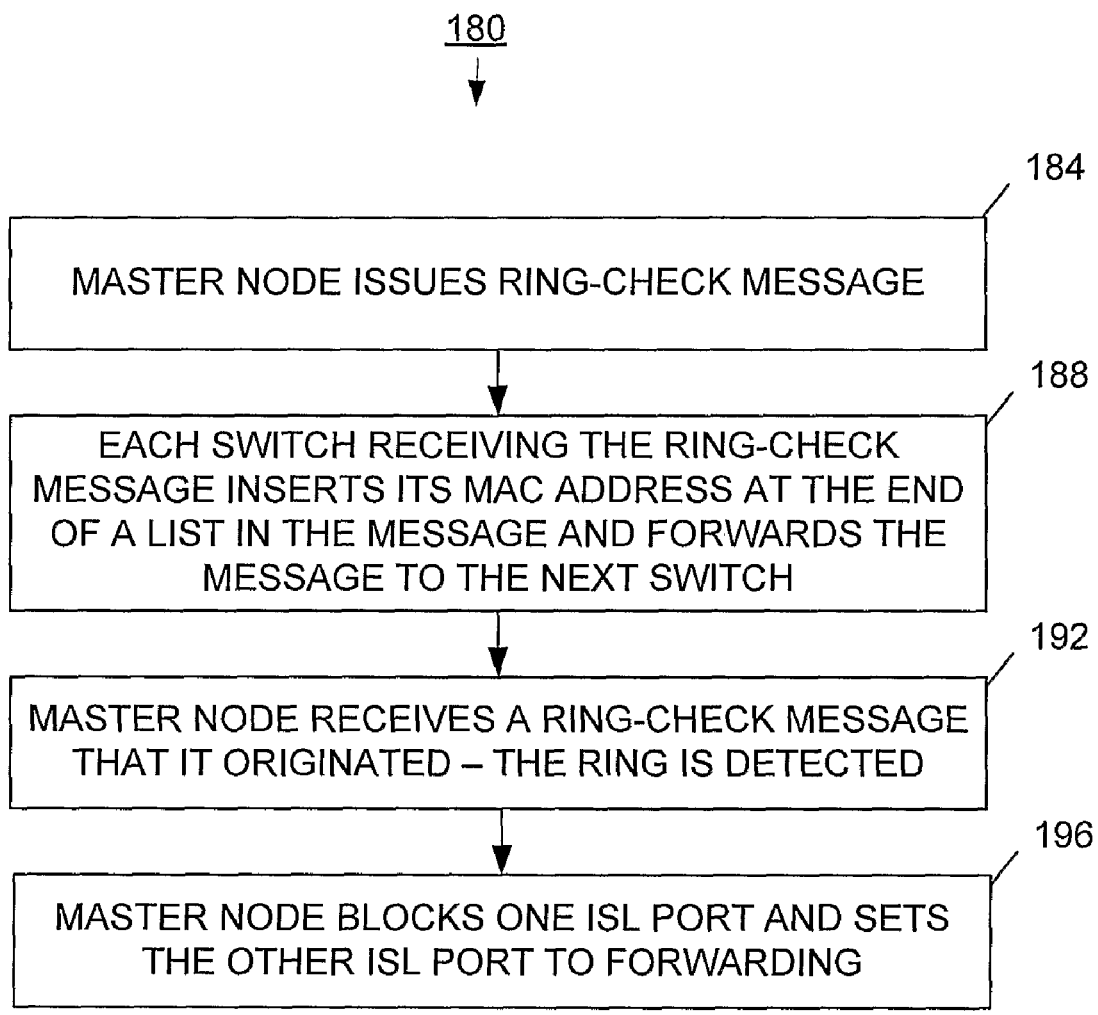
FIG. 8 is a flow diagram of an embodiment of a ring-detection process for detecting a ring resulting from daisy chaining the switches of a rack-switch.

FIG. 8 shows an embodiment of a process 180 by which the master node detects the ring (or loop) formed by the ISLs and "opens" the loop to prevent undesired proliferation of traffic passing through the loop. At step 184, the master node issues a Ring-check message. Upon receiving the Ring-check message from the master node, a switch inserts (step 188) its MAC address at the end of a node list in the Ring-check message and forwards this Ring-check message over another ISL link to the next switch in the daisy chain. Similarly, each subsequent switch in the daisy chain receives the message, inserts its MAC address, and forwards the message.

When the master node receives a Ring-check message that the master node originated—i.e., switch recognizes its own MAC address as the first node in the node list in the Ring-check message—the master node determines (step 192) that the ring is formed. The master node can display a message on the console at the switch, indicating that the ring is formed, if this is the first time the ring has formed since a last ring break or since the rack-switch system booted up. Before the formation of the ring, the master node sends Ring-check messages periodically through each ISL port. After the formation of the ring, the master node blocks (step 196) one of its ISL ports, sets the other ISL port to the FORWARDING state, and sends Ring-check messages over the Forwarding ISL port.

Ring-Break Detection

Two events can cause a switch to generate a Ring-break message: (1) an ISL link goes down; and (2) a Ring-check message arrives at a switch with only one ISL. The originator of the Ring-break messages places its MAC address as the first node in a node list. Each switch receiving the Ring-break message appends its MAC address to the node list and displays a ring-terminated message on its console.

An ISL link that goes down triggers a Ring-break message from each affected nodes (i.e., the two switches connected by that ISL). Each Ring-break message propagates through each switch in the rack-switch. In addition to displaying the ring-terminated warning message, each switch maintains the state of the ring.

If a node has one ISL link only—because the other ISL link is down or never becomes operational—the node replies with a Ring-break message upon receiving a Ring-check message. This Ring-break message also serves to notify each of the other nodes in the event a previously transmitted link down message was lost.

STP States of ISL Ports

The RDC protocol—and not the Spanning Tree Protocol (STP)—controls the STP states of each ISL port in the rack-switch. Each node can send and receive RDC protocol messages irrespective of its ISL STP state. During normal operation, the master node has one FORWARDING ISL port and one BLOCKED ISL port to avoid a data loop in the ring. Both ISL ports of the transit nodes are in the FORWARDING state.

When an ISL link first comes up, the STP state of the ISL port remains at a BLOCKED state until the node receives a Ring-break message (from any node) or a Make-FWD message from the master node. Upon receiving a Ring-break message, the master node unblocks its BLOCKED ISL port. If a transit node receives a Ring-break message, that transit nodes sets each of its ISL ports to the Forwarding state.

After the master node detects ring restoration, the master node blocks one of its ISL ports and sets the other ISL port to the FORWARDING state. Then, the master node sends a Make-FWD message to its forwarding ISL port. The Make-FWD message instructs each transit node to change its ISL port states to forwarding because the newly up ISL link is still in a BLOCKED state. These actions remove the temporary loop in the ring. The state transitions to remove the ring can take as few as 1 to 2 seconds. In contrast, the STP state transitions for traditional STP can take approximately 30 seconds to reach the Forwarding state. The master node continues to send Make-FWD messages until the master node receives a Make-FWD message on its blocked ISL port (i.e., because the message has traversed the loop). If the master node receives, on an ISL port, an RDC protocol message that originated from that ISL port (i.e., a loop-back), the master node places that ingress port into a BLOCKED state.

Push IP Addresses

The administrator at the SPM may assign IP addresses to the IP interface of each switch in the rack-switch. All IP interfaces are on the same subnet and VLAN. Initially, the switch with which the SPM is in communication has a manually configured IP address on the IP interface. This manually configured IP address serves as base IP address. The IP addresses for the other switches in the rack-switch are the next consecutive or wrap-around IP addresses.

When the SPM application program issues a Push IP addresses command through SNMP, the switch with which the SPM is in communication generates a list of consecutive IP addresses for the other switches in the rack-switch and sends an Push IP addresses message to its neighboring switch through one of the ISL ports. This Push IP addresses message travels hop-by-hop; each switch removes the first IP address in the list within the message and decrements the count (of the number of IP addresses in the list). These IP addresses are used for the IP interface. When an administrator changes the base address and issues a Push IP address command again, each IP interface address, subnet, and VLAN changes accordingly. If a ring has not yet formed in the rack-switch, the switch ignores the Push IP addresses command from the SPM.

Uplink-Forwarding Control Protocol

Instead of using the Spanning Tree Protocol, one embodiment of the invention uses an Uplink-Forwarding Control (UFC) protocol to determine the STP states of each uplink port in the rack-switch. On each switch of the rack-switch, STP is off globally; the switch discards any bridge PDUs received from an external network.

The STP state of an uplink port can be Disabled, Blocking, or Forwarding. If an uplink port is down (inactive or non-operational), the state of that uplink port is Disabled. An uplink port in the Blocking state is operational, but prevented from forwarding to or receiving traffic from the external network. In the Forwarding state, an uplink port can operate to exchange traffic with the external network.

In a rack-switch, each uplink port can belong to multiple VLANs and, thus, be included in multiple spanning trees. Each spanning tree may include one, more than one, or all of the uplink ports in the rack-switch. In addition, only one uplink port of the operational uplinks can be forwarding packets at any given time. The UFC protocol achieves these criteria. In brief, the UFC protocol assigns precedence to each uplink port in an STG (Spanning Tree Group). The uplink port with the highest precedence (e.g., lowest value) of the uplinks ports in an STG becomes the uplink port with a Forwarding state. The bridge whose uplink port is in the Forwarding state is called the root bridge. The other uplink ports are set either to a Blocking state or to a Disabled state.

Figure 9:
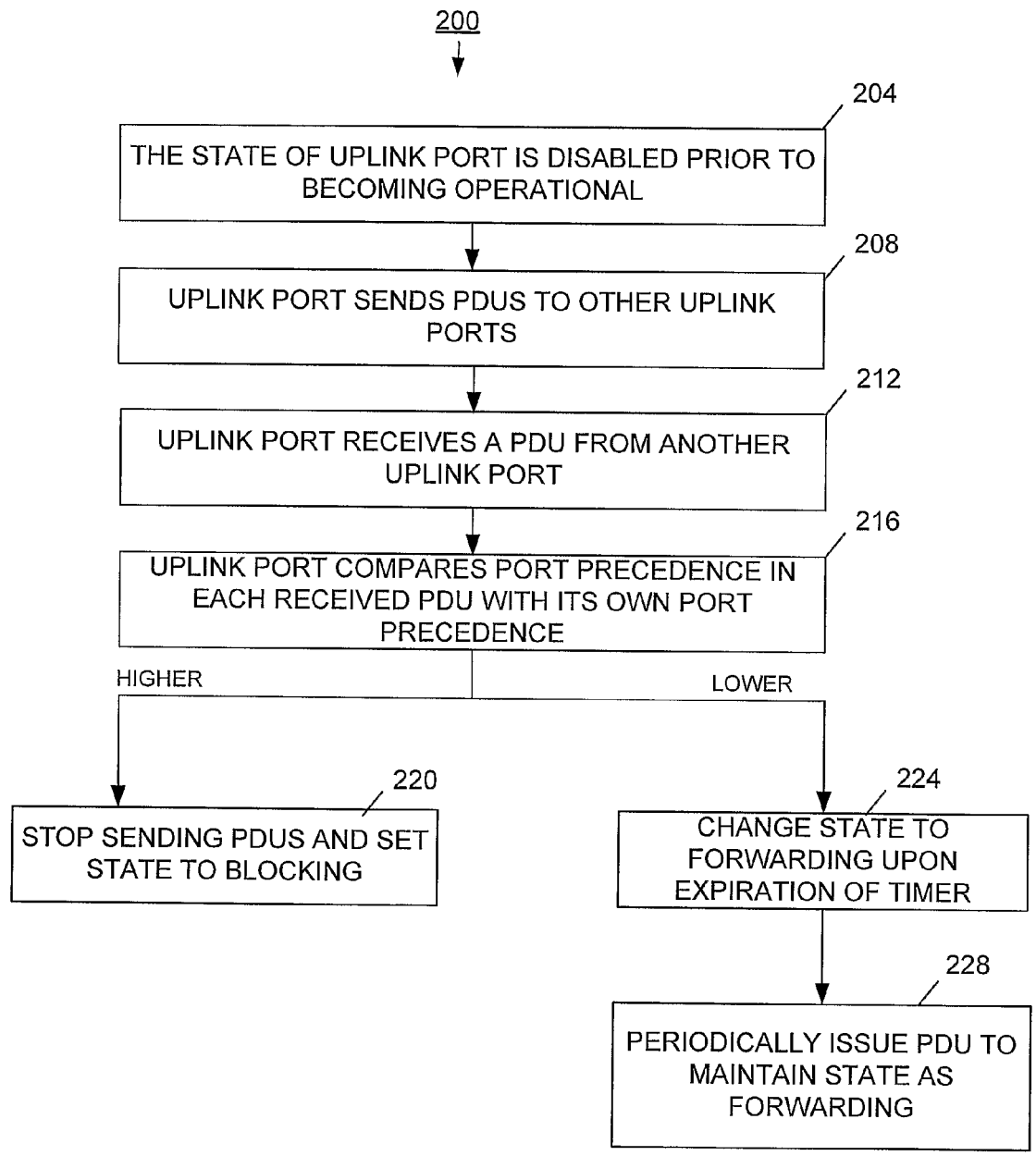
FIG. 9 is a flow diagram of an embodiment of a process for controlling a Spanning Tree Protocol state of each uplink port in a rack-switch.

FIG. 9 shows an embodiment of a process 200 for determining which uplink in the rack-switch is the Forwarding uplink. At step 204, before an uplink becomes operational, the state of that uplink is Disabled. Initially, in the Disabled state, the uplink has lowest port precedence, which represents uplink down. When the uplink comes up, the uplink port attempts to become the Forwarding port in an STG by sending (step 208) a PDU to the other uplink ports. Each UFC protocol PDU is an untagged 802.3 multicast packet sent through a default VLAN over a forwarding ISL (i.e., not over an uplink). This PDU propagates hop-by-hop over the ISLs and includes the port precedence in that STG of the sending uplink port. The port precedence in the PDU may be the initial default setting or a setting configured by an administrator. The PDU also includes a hello timer and a flag to denote whether the bridge is in the Blocking state (e.g., the flag is set to 1 for Blocking, or to 0 for Forwarding). Upon sending this PDU, the uplink port starts a forward-delay timer.

Each switch in the rack-switch maintains two timers: the above-noted forward-delay timer and above-noted hello timer. The forward-delay timer determines an interval, which, if it expires, causes an uplink port to transition from a Blocking state to a Forwarding state and to adjust its hello timer, e.g., to be 5 times (5×) that of the original hello timer.

The hello timer indicates an interval at which the bridge multicasts a PDU to the other switches. If a hello timer expires on the root bridge (i.e., the uplink state is Forwarding), the switch issues a bridge PDU. If a hello timer expires on a non-root bridge (i.e., the uplink state is Blocking), this indicates that the root bridge has timed out and the rack-switch needs to select a new root bridge. Consequently, the non-root bridge substitutes the currently stored root bridge PDU with its own bridge PDU, starts issuing bridge PDUs, and starts the forward-delay timer and hello timer.

Initially, when a root bridge is elected, it may be preferable to issue PDUs more frequently (i.e., with a short hello timer) than when a root bridge is already selected. Conversely, it may be preferable for a switch that may not become a root bridge to have more time before timing out during the root bridge selecting stage.

During the root-bridge selection process, each uplink port receives (step 212) a PDU from another uplink port in the same STG and compares (step 216) the received PDU with its PDU. A PDU has higher precedence over another PDU if the port precedence is higher than that other PDU. If the two PDUs have equal port precedence, the PDU with the lower MAC address has higher precedence over the other PDU. If the received PDU has a higher precedence, the §0 receiving uplink port stops (step 220) sending its bridge PDU, and sets its state to Blocking. Otherwise, the receiving uplink port continues its attempt to become the Forwarding uplink in the rack-switch. Upon the expiration of the forward-delay timer, the uplink port changes (step 224) its state from Blocking to Forwarding if during the interval the uplink port does not receive a PDU from an uplink port having a higher precedence.

If an uplink port becomes the Forwarding port of the rack-switch, the associated switch continues (step 228) to issue bridge PDUs to maintain its own state as Forwarding and to keep the other uplink ports in a Blocking state. Each switch in the rack-switch stores the highest PDU received from the other bridges for each STG. The uplink of the switch having the highest PDU eventually becomes the Forwarding uplink and is the root bridge for the uplink-forwarding control protocol. If another operational uplink port obtains a higher port precedence, the originally Forwarding uplink changes its state to Blocking. To maintain its state as Forwarding, the new root bridge sends the highest PDU to the switches. This PDU includes the MAC address and uplink port precedence of the root bridge.

Various link events that occur during the operation of the rack-switch can cause a switch to take an action. These link events include (1) Uplink Up, (2) Uplink Down, and (3) ISL up. For Uplink Up events, if the switch receives a bridge PDU that is higher than the root bridge PDU stored by the switch, then the switch attempts to become the root bridge. The switch makes the state of the uplink port to Blocking and stops the hello timer. The switch then starts the hello timer and forward delay timer, and starts issuing bridge PDUs. The switch updates its stored root bridge PDU with its own bridge PDU. Alternatively, if the bridge PDU is lower than the root bridge PDU, the switch takes no action.

For Uplink Down events, if the uplink for the switch goes down, the switch places the uplink port in the Disabled state in each STG and stops the hello timer. If the uplink was in the Forwarding state for an STG, the switch issues a bridge PDU with lowest port precedence and starts the hello timer.

For ISL Up events, when a switch receives a Make-FWD message to change the STP state of an ISL from Blocking to Forwarding, if the uplink of that switch is Forwarding in one or more STGs, the switch changes the state of the uplink to Blocking (in each STG) and starts the forward-delay timer before changing the ISL to the Forwarding state.

Upon receiving a bridge PDU, a given switch compares the PDU with the root bridge PDU stored on the bridge. If the newly received PDU is higher than the root bridge PDU, this indicates that there is a new root bridge, and that an update needs to occur to reflect the new root bridge.

If the newly received bridge PDU is lower than the root bridge PDU, any one of the following events may have occurred. For one, if an uplink is down on another switch, that switch sends out a port precedence that is lower than the port precedences of the other switches. Alternatively, if a switch crashes, the switch whose hello timer expires first sends out its bridge PDU, which may be lower than the PDU stored at the receiving switch. As another alternative, if an ISL link is up, the switch may issue the lower bridge PDU.

The following pseudo-code illustrates those actions that can be taken when a switch receives a PDU:

```
if uplink down /* state Disabled */
{
    if stored bridge PDU is less than received PDU
    {
        update stored bridge PDU.
        stop current hello timer.
        start hello timer based on the received PDU.
    }
    else
        discard the received PDU.
}
if uplink up
{
    if switch participate in the STG,
    {
        compare incoming with stored bridge PDU.
        {
            if higher than stored bridge PDU
            {
                if Forwarding, make state Blocking
```

-continued

```
    replace stored bridge PDU with the higher one with its Mac
    address,
    stop Forward delay timer if any.
    if (PDU denotes Blocking)
        start hello timer 16X of hello timer in the receiving PDU.
    if (PDU denotes Forwarding)
        start hello timer using 2X of hello timer in the receiving PDU.
  }
  if lower than stored bridge PDU,
  {/* ISL link up, or uplink down, or a switch becomes
  non-operational */
    if Forwarding, make state Blocking
    stop existing hello timer.
    start its own hello timer.
    start Forward delay timer
  }
else
{/* if crash, let everyone timeout itself */
  if with link down port precedence,
    send PDU,
    stop hello timer.
    if Blocking, start Forwarding timer
  }
  if equal to the stored bridge PDU
    feed the existing timer.
}}}
```

Rack-Switch Failover

Rack-switch failover is a mechanism designed to provide fault tolerance in a multi-rack-switch environment. As described above, a multi-chassis environment can include dual-stacks (i.e., redundant rack-switches), with one rack-switch operating as an active rack-switch and the other rack-switch operating as a standby rack-switch. The mechanism employs aspects of the single-chassis failover technique described above. The rack-switch failover mechanism can be configurable; that is, the activation of the mechanism is a run-time decision.

In brief overview, the rack-switch failover mechanism operates to transition from the active rack-switch to the standby rack-switch upon the occurrence of a failover-triggering event. Rack-switch failover trigger occurs if the active rack-switch does not have at least one operating (i.e., healthy) uplink and a healthy ISL daisy chain. Presumably, the standby rack-switch has a healthy uplink and healthy ISL daisy chain so that normal operation can continue after the failover transitions control to the standby rack-switch. A healthy uplink means that the uplink is in the STP Forwarding state. A healthy ISL daisy chain means that traffic can reach each switch in the rack-switch over the ISLs. The rack-switch failover mechanism employs a rack-switch failover message (RFM) protocol to control inter-switch communication used to manage the propagation of failover information and port status to each switch in the rack-switch.

Figure 10:
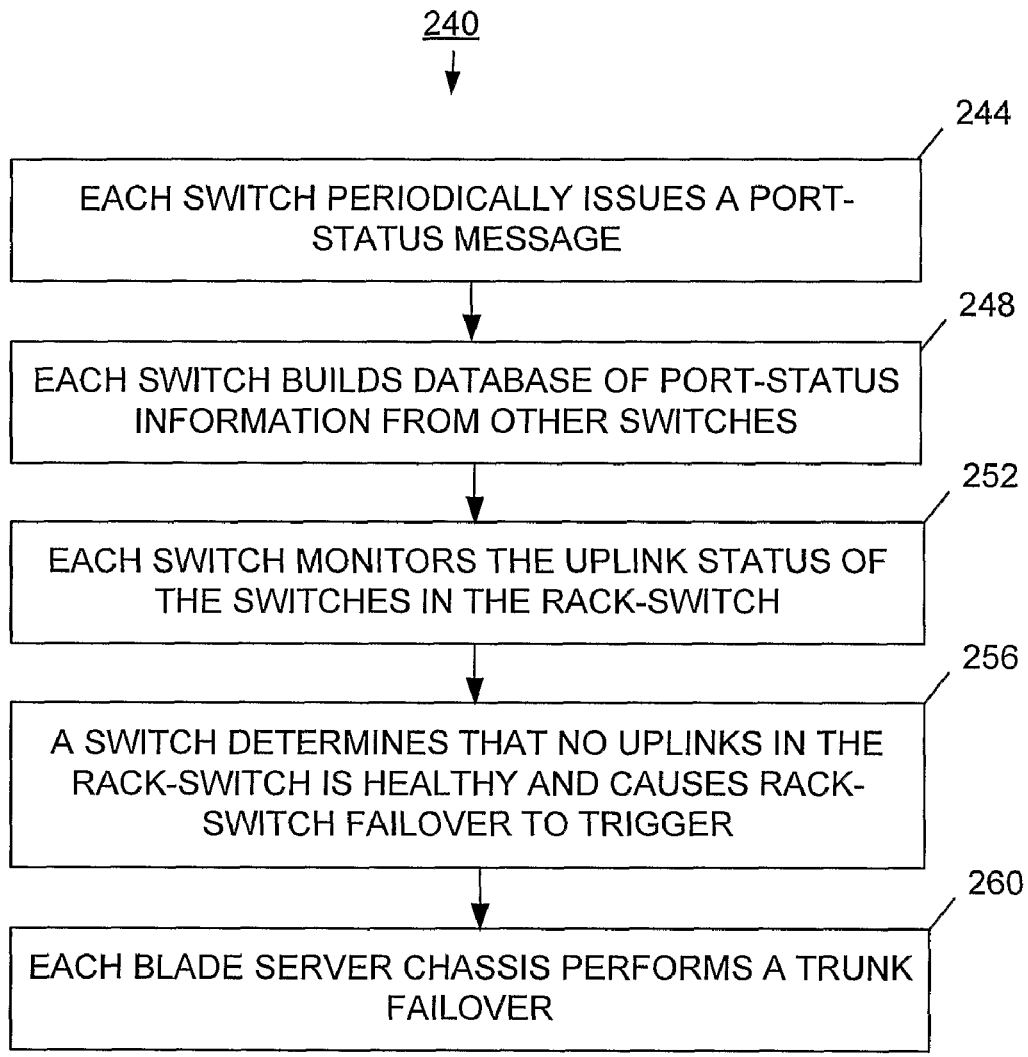
FIG. 10 is a flow diagram of an embodiment of a process of performing a failover in the event of a failover-triggering event.

FIG. 10 shows an embodiment of a process 240 for implementing rack-switch failover. At step 244, each switch with a healthy uplink periodically issues a port status message to notify the other switches of each healthy uplink in the switch. The frequency at which to issue a port status message can be configurable. Instead of using a standard VLAN-based auto monitor, the rack-switch failover mechanism employs a manual port monitor mechanism. The manual port monitor mechanism examines the STP state of a specified port that is a member of each configured VLAN belonging to each enabled STG. If any one STP state of an uplink port is Forwarding, the state of the uplink port is healthy.

In one embodiment, each port status message is an 802.3 L2 multicast packet sent over the ISLs on the default VLAN. Port-status messages include the following information: a chassis ID, a bay ID, port status, monitor, and control.

If a switch has no healthy uplink, then the switch does not need to send a port status message, except when the switch has previously reported a healthy uplink and now the last of its healthy uplinks has failed. In such an instance, the switch sends a port status message indicating that the switch has no healthy uplinks. The switch sends this message for a predetermined number—set by default or configurable—of consecutive intervals (e.g., 5).

From these propagated messages, each switch constructs and maintains (step 248) a database with the number of healthy uplinks for each switch in the same rack-switch. This information updates whenever the switch receives a port status message. In addition, each switch can associate age with the information stored for each switch, and treat any information older than a predetermined age to have expired. A configurable timer can be used to represent the age. Accordingly, each switch monitors (step 252) the current uplink status of the other switches in the same rack-switch and watch for a failover-triggering event.

When a switch in the rack-switch determines (step 256) from the database that there is no healthy uplink in the rack-switch, that switch disables (i.e., brings down) the pre-specified internal server links to the server blades. Disabling the server links triggers a rack-switch failover. When rack-switch failover is triggered, each blade server chassis in the rack-switch performs (step 260) a trunk failover so that each server blade changes its active internal server link from one NIC to a standby NIC. As a result, the server blades of each blade server chassis transition from communicating with the switches of the active rack-switch to the switches of the standby rack-switch.

If a healthy uplink later becomes available in the active rack-switch, a switch can enable (i.e., bring up) the pre-specified internal server links, to induce a failover from the standby rack-switch to the active rack-switch. Because of the paucity of information about healthy uplinks in the rack-switch, a switch shortly after reboot should not bring the server links down for a predetermined (configurable) period after the daisy-chain loop becomes healthy and can propagate traffic.

For a rack-switch failover to occur reliably, the active rack-switch relies on a healthy loop of daisy-chained ISLs. A healthy ISL loop enables rack-switch failover messages to propagate to the other switches in the rack-switch. Otherwise, if a healthy loop of daisy-chained ISLs cannot be maintained because of, for example, either traffic congestion or loss of connectivity, an unreliable partial failover of the rack-switch may ensue.

The following actions can contribute towards achieving reliable rack-switch failovers: (1) ensuring that the ISLs are healthy (an unhealthy ISL, e.g., no link, congested, or not forwarding, may disrupt failover detection and result in unpredictable behavior); (2) periodically sending a port-status message—the frequency of such notification can be a configurable option with the default rate set at 5 seconds—to notify the other switches in the rack-switch; trigger port status updates through events (i.e. triggered by port link changes or by an idle timeout); (3) immediately reporting any port status change from healthy to unhealthy or from unhealthy to healthy through a port status message; (4) maintaining, by each switch, a database of the port status for the other switches in the rack-switch; and (5) performing a failover check when a local or remote port status update occurs.

Events that cause an update to the port status of the rack-switch include initially booting-up a switch, enabling or disabling the rack-switch failover mechanism, making a configuration change that affects the rack-switch failover mechanism (e.g., redefining or clearing monitor (i.e., uplink) ports or control (i.e., internal) ports), detecting a change in a port state, and receiving a port status idle update.

Rack-Switch Operation at the Data Plane

In brief overview, normal operation of a rack-switch can include server blade-to-server blade communication through the ISLs and server blade-to-Internet communication through the uplinks in the same chassis. At the data plane, the rack-switch 10' can function as a Layer 2 device (called pure L2), a Layer 3 device (called pure L3), or a combination of Layers 2 and 3 (called mixed L2/3). L2 communications entail forwarding traffic (no routing) among the switches in the same IP subnet. L3 communications entail routing traffic across subnets (i.e. VLANs).

Layer 2 Data Plane Functionality

For L2 data plane operation, the switches of the rack-switch can use either IGMP Snooping or Static Multicast to avoid unnecessary flooding of Internet Protocol Multicasting (IPmc) to all external ports when populating a static L2 forwarding table. For Static Multicast, the rack-switch runs a protocol over the daisy-chain ISL loop to exchange the Static Multicast information among the switches in the rack-switch. The ISL ports are added automatically to a multicast group whenever needed. Consequently, there is no need to add ISL ports to a multicast group during configuration of Static Multicast. An alternative to running this protocol is to add the ISL ports of a switch to all multicast groups during configuration of Static Multicast. IGMP Snooping requires no alterations or enhancements in order for the switches to operate in a pure Layer 2 Data Plane. If neither Static Multicast nor IGMP Snooping is activated, the external ports can operate properly by treating the IPmc traffic as broadcast packets.

In a dual-rack-switch environment, certain conditions are preferred for L2 operation. First, the daisy chain of the active rack-switch has to be healthy. In addition, the rack-switch failover mechanism is enabled. If a rack-switch has more than one uplink, the STP can be used to detect and break unwanted loops in a network. To prevent STP from blocking any of the ISLs ports, the rack-switch executes the UFC protocol, described above, with the port precedence and path cost of each uplink port in an STG being configured such that an uplink, instead of an ISL link, is blocked if a bridge loop exists.

In addition, if a rack-switch has more than one uplink, and load distribution over those uplinks is desired, multiple VLANs and multiple STGs are used such that different uplinks carry traffic of different VLANs. If IPmc (either Static Multicast Bridging or IGMP Snooping) is enabled in one switch, then IPmc is enabled in each of the other switches in the same rack-switch. For handling IPmc traffic, a control protocol can operate over the daisy chain of the active rack-switch to exchange IPmc information. Further, the ISL ports are added to multicast groups whenever needed. An alternative is to add both ISP ports into all multicast groups during configuration of Static Multicast.

Layer 3 Data Plane Operation

For L3 data plane operation, IPmc packets are routed from one VLAN to another VLAN. In a rack-switch, the ISL and server ports are placed into one (or more) VLAN(s), and the uplink ports are placed into different VLANs. The routing interfaces of the switches in the rack-switch are Virtual Router Redundancy Protocol (VRRP)-based, and the priorities of the VRs (Virtual Routers) in different switches are configured such that the uplinks of switches in the same chassis are favored when performing sever-to-Internet communication. In addition, the VRs in each switch monitor the health state of the uplink on the same switch. If the uplink fails, the VRs on this switch do not claim any VRRP Master mode.

In upstream (i.e., external) routers, static routes can be added to load balance the traffic arriving from the external network to the internal server blades when there are more than one route in between the rack-switch and its external upstream routers.

In a dual-rack-switch environment, certain conditions are preferred to implement L3 operation. The daisy chain of the active rack-switch has to be healthy, and the Rack-switch failover feature is enabled. The VRs for external VLANs in each switch monitor the STP state of the uplinks in the same switch such that a VR does not claim to be a VRRP Master if none of the uplinks in the same switch is in "forwarding" state. The VRs for internal VLANs in each switch are grouped with an external VR in the same switch such that an internal VR does not claim to be Master if the associated external VR is not in a Master state. An L2 link between the two rack-switches dispenses with any need for this grouping. If there is no L2 connection between the two rack-switches, the IP addresses of the internal VLANs of the backup rack-switch are inaccessible to the external network if each of the external VRs of that rack-switch is not in a VRRP Master state.

If IPmc is enabled in one switch (either Static Multicast Routing or IGMP Proxy), IPmc is enabled in each of the other switches in the same rack-switch. For handling IPmc traffic, a control protocol is implemented on the daisy chain loop to exchange IPmc information. ISL ports are added to multicast paths whenever needed. Alternatively, the ISP ports of a switch are added to all multicast groups during configuration of Static Multicast. If more than one switch has MR (Multicast Routers) on its uplink ports, only one of switches can claim to be IPmc Master; each of the other switches can be IPmc Backup. Only the IPmc Master can pass the IPmc traffic from one VLAN (e.g., internal VLAN) to another (e.g., external VLAN), including sending IGMP Queries. Implementing either DHCPACK Intercept or DHCP Server can facilitate the change of the default gateways on a server blade.

High (Distributed) Computing Environment

In a high-computing environment, modifications to the L2 and L3 configurations described above can improve the performance of a rack-switch. Traffic patterns and traffic loads of applications executing in a high computationally intensive environment may determine the nature of such modifications. For example, if a chassis of server blades has no need to communicate with the external network, or the traffic load is light, the uplink for the switch in that chassis can be disconnected. In this example, fewer than all of the switches in the rack-switch have an uplink connecting the rack-switch to the external network. In addition, when at least two of the switches in the rack-switch have a connected uplink, there is a degree of protection (i.e., redundancy) without needing a second switch within each chassis. As another example, the stacking arrangement of the plurality of chassis within a rack-switch can be designed to reduce the number of hops experienced by server-to-server communications.

Aspects of the present invention, for example, the SPM application program, may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

Although the invention has been shown and described with reference to specific preferred embodiments, it should be understood by those skilled in the art that various changes in form and detail may be made therein without departing from the spirit and scope of the invention as defined by the following claims.

What is claimed is:

1. A rack-switch, comprising:
   a plurality of switches, each switch having a plurality of external ports, at least two of the external ports of each switch being inter-switch link (ISL) ports, one of the plurality of switches being a master node;
   a plurality of server blades, each server blade being in electrical communication with one of the plurality of switches; and
   a plurality of inter-switch links, each inter-switch link electrically connecting one ISL port of one of the plurality of switches to one ISL port of another of the plurality of switches, the plurality of inter-switch links interconnecting the switches of the plurality of switches such that the switches of the plurality of switches are daisy chained in a loop,
   wherein the master node detects the loop formed by the interconnected plurality of inter-switch links and, in response to detecting the loop, places one of the ISL ports of the master node into a blocked state in order to open the loop, the master node monitoring the loop while that one of its ISL ports is in the blocked state and unblocking that one blocked ISL port in response to detecting that the loop is broken, wherein the master node has a MAC (Media Access Control) address, transmits through one of the ISL ports of the master node a message containing a list of nodes in which the MAC address of the master node is first in the list of nodes, and detects the daisy-chain loop by receiving the message and recognizing the MAC address as first in the list of nodes contained in the message.

2. The rack-switch of claim 1, wherein the ISL ports of each switch are Ethernet ports.

3. The rack-switch of claim 1, further comprising a computing system in communication with a given one of the plurality of switches of the rack-switch, the computing system executing program code to initiate automatic discovery of the plurality of switches of the rack-switch through the given one of the plurality of switches.

4. The rack-switch of claim 1, wherein at least one of the external ports of each switch is an uplink port, and wherein the plurality of switches executes program code for determining which one of the uplink ports is to be placed in a forwarding state while each other uplink port is placed in a non-forwarding state.

5. The rack-switch of claim 1, wherein the plurality of switches determines which one of the switches is the master node based on messages circulated around the loop by the plurality of switches.

6. A rack-switch, comprising:
   a rack;
   a plurality of blade server chassis within the rack, each blade server chassis having at least one switch and a plurality of server blades in communication with the at least one switch, each switch having a plurality of external ports, at least two of the external ports of each switch being inter-switch link (ISL) ports, the at least one switch of one of the plurality of blade server chassis being a master node; and
   a plurality of inter-switch links, each inter-switch link electrically connecting one ISL port of one of the plurality of switches to one ISL port of another of the plurality of switches, the plurality of inter-switch links interconnecting the switches of the plurality of switches such that the switches of the plurality of switches are daisy chained in a loop, the inter-switch links conveying Ethernet packets representing server-to-server communications between server blades of different blade server chassis,
   wherein the master node detects the loop formed by the plurality of inter-switch links and, in response to detecting the loop, places one of its ISL ports into a blocked state in order to open the loop, the master node monitoring the loop while that one of its ISL ports is in the blocked state and unblocking that one blocked ISL port in response to detecting that the loop is broken, wherein the master node has a MAC (Media Access Control) address, transmits through one of the ISL ports of the master node a message containing a list of nodes in which the MAC address of the master node is first in the list of nodes, and detects the daisy-chain loop by receiving the message and recognizing the MAC address as first in the list of nodes contained in the message.

7. The rack-switch of claim 6, further comprising a computing system in communication with a given one of the plurality of switches of the rack-switch, the computing system executing program code to initiate automatic discovery of the plurality of switches of the rack-switch through the given one of the plurality of switches.

8. The rack-switch of claim 6, wherein at least one of the external ports of each switch is an uplink port, and wherein the plurality of switches executes program code for determining which one of the uplink ports is to be placed in a forwarding state while each other uplink port is placed in a non-forwarding state.

9. A blade server system, comprising:
   a plurality of rack-switches, each rack-switch including:
      a plurality of switches, each switch having a plurality of external ports, at least two of the external ports of each switch being inter-switch link (ISL) ports, one of the plurality of switches being a master node;
      a plurality of server blades, each server blade being in electrical communication with one of the plurality of switches; and
      a plurality of inter-switch links, each inter-switch link electrically connecting one ISL port of one of the plurality of switches to one ISL port of another of the plurality of switches, the plurality of inter-switch links interconnecting the switches of the plurality of switches such that the switches of the plurality of switches are daisy chained in a loop,
      wherein the master node detects the loop formed by the plurality of inter-switch links and, in response to detecting the loop, places one of the ISL ports of the master node into a blocked state in order to open the loop, the master node monitoring the loop while that one of its ISL ports is in the blocked state and unblocking that one blocked ISL port in response to detecting that the loop is broken, wherein the master node has a MAC (Media Access Control) address, transmits through one of the ISL ports of the master node a message containing a list of nodes in which the MAC address of the master node is first in the list of nodes, and detects the daisy-chain loop by receiving the message and recognizing the MAC address as first in the list of nodes contained in the message.

10. The blade server system of claim 9, wherein a first one of the plurality of rack-switches is redundant to a second one of the plurality of rack-switches.

11. The blade server system of claim 10, wherein the first one of the plurality of rack-switches executes program code to cause operation to transition from the first one of the plurality of rack-switches to the second one of the plurality of rack-switches when a failover-triggering event is detected.

12. The blade server system of claim 9, wherein the ISL ports of each switch in each of the plurality of rack-switches are Ethernet ports.

13. The blade server system of claim 9, further comprising a computing system in communication with a given one of the plurality of switches of each rack-switch, the computing system executing program code to initiate automatic discovery of the plurality of switches of each rack-switch through the given one of the plurality of switches of that rack-switch.

14. The blade server system of claim 9, wherein at least one of the external ports of each switch is an uplink port, and wherein the plurality of switches executes program code for determining which one of the uplink ports is to be placed in a forwarding state while each other uplink port is placed in a non-forwarding state.

15. The blade server system of claim 9, wherein the plurality of switches determines which one of the switches is the master node based on messages circulated around the loop by the plurality of switches.

16. A method for managing and operating a rack-switch having plurality of switches electrically connected to a plurality of server blades, the method comprising:

electrically interconnecting the plurality of switches in a daisy-chain loop using inter-switch links, each inter-switch link electrically connecting one inter-switch link (ISL) port of one of the plurality of switches to one ISL port of another of the plurality of switches, one of the plurality of switches being a master node, the inter-switch links carrying Ethernet packets representing server-to-server data communications between server blades;

detecting, by the master node, the daisy-chain loop formed by the inter-switch links; and blocking, by the master node in response to detecting the daisy-chain loop, one of the ISL ports of the master node from transmitting data communications over one of the inter-switch links; and monitoring, by the master node, the daisy-chain loop while that one of its ISL ports is in the blocked state and unblocking that one blocked ISL port in response to detecting that the daisy-chain loop is broken; associating a MAC (Media Access Control) address with the master node; transmitting, by the master node through one of its ISL ports, a message containing a list of nodes, the list of nodes having the MAC address of the master node as first in the list of nodes, and wherein detecting the daisy-chain loop includes receiving, by the master node, the message and recognizing the MAC address as first in the list of nodes contained in the message.

17. The method of claim 16, further comprising the step of initiating automatic discovery of the plurality of switches of a rack-switch.

18. The method of claim 16, wherein each switch of the plurality of switches has an uplink port for communicating with an external entity, and further comprising the step of determining which one of the uplink ports is to be placed in a forwarding state while each other uplink port is placed in a non-forwarding state.

19. The method of claim 16, further comprising determining the master node based on messages circulated around the daisy-chain loop by the plurality of switches.

* * * * *